G. SWENSON.
Saw-Sets.

No. 140,441. Patented July 1, 1873.

Witnesses:
A. W. Almqvist
S. Sedgwick

Inventor:
G. Swenson
Per
Attorneys.

AM. PHOTO-LITHOGRAPHIC CO. N.Y. (OSBORNE'S PROCESS.)

UNITED STATES PATENT OFFICE.

GUSTAF SWENSON, OF HACKENSACK, NEW JERSEY.

IMPROVEMENT IN SAW-SETS.

Specification forming part of Letters Patent No. 140,441, dated July 1, 1873; application filed April 12, 1873.

*To all whom it may concern:*

Figure 1:
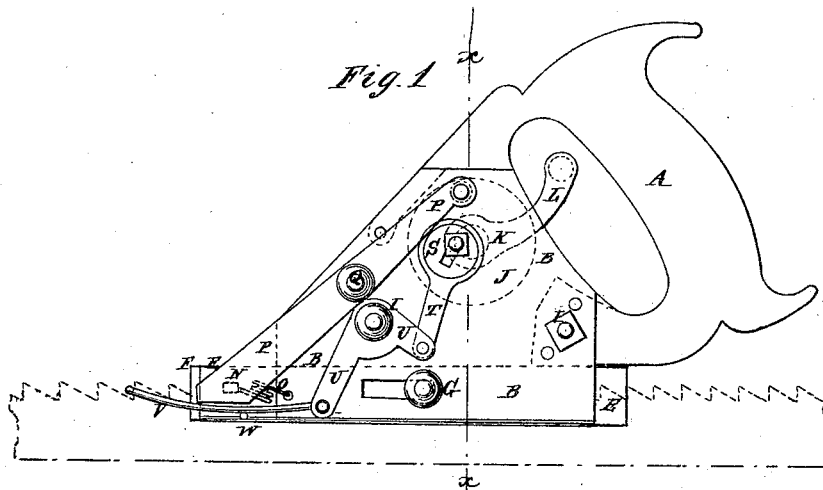
Figure 2:
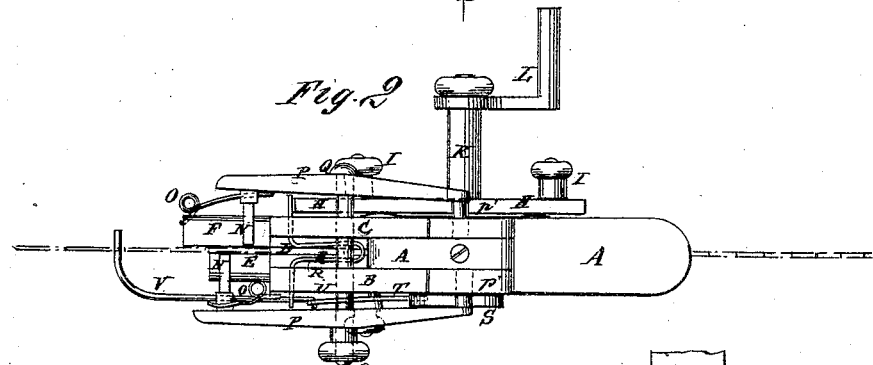
Figure 3:
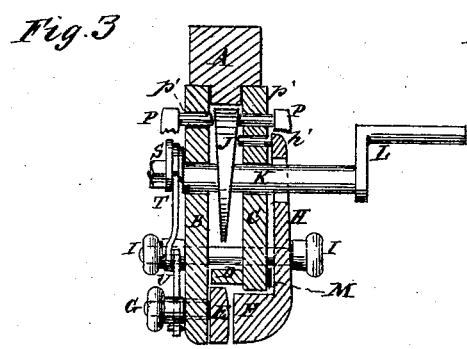
Figure 4:
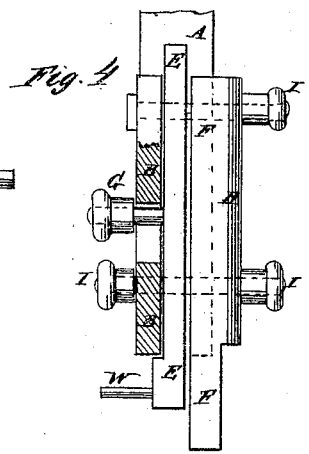

Be it known that I, GUSTAF SWENSON, of Hackensack, in the county of Bergen and State of New Jersey, have invented a new and useful Improvement in Saw-Set, of which the following is a specification:

Figure 1 is a side view of my improved saw-set. Fig. 2 is a top view of the same. Fig. 3 is a detail vertical section of the same taken through the line $x\,x$, Fig. 1. Fig. 4 is a bottom view of the same, the levers and feed being removed and part being broken away to show the construction.

Similar letters of reference indicate corresponding parts.

This invention relates to an improved combination of parts or devices for setting teeth on both sides of the saw at the same time, as hereinafter described and explicitly set forth in the claims.

A is the handle, to the opposite sides of the forward part of which are attached two plates, B C, which are kept at the proper distance apart by a bar or flange, D, formed upon or attached to one of said plates near its lower edge, and resting against the other plate, as shown in Fig. 3. The bar or flange D also serves as a stop for the points of the saw-teeth to rest against while using the machine.

The bar or flange D may be made movable, or in two parts, one stationary and the other movable so as to be adjustable according to the length of saw-teeth. The movable bar, or the movable part of the bar, may be adjusted by a set-screw.

The saw-teeth to be operated upon pass between two bars, E F. The bar E, when the machine is in use, is stationary, and is secured to the inner side of the downwardly-projecting lower edge of the plate B by a bolt and hand-nut, G, which bolt passes through a slot in the said plate B, so that, by loosening the said hand-nut, the said bar E may be adjusted according to the size of the saw-teeth.

The bar F is formed upon the side of the lower edge of a plate, H, which is placed upon the outer side of the plate C in such a position that the bars F and E may be opposite to and parallel with each other. The plate H is secured in place upon the plate C by hand-nuts and bolts I, which bolts pass through the plates B C, so as to hold the said plates in place. To the upper part of the plate H is attached a pin, $h'$, which passes in through a hole in the plate C, and rests against the inclined side of the cam-wheel J, so as, at the proper time, to move the bar F inward to clamp the saw against the bar E while a tooth is being operated upon. The wheel J is made wedge-shaped, as shown in Fig. 3, so that its sides may operate as cams, and the said wheel is attached to a shaft, K, that passes through holes in the plates B C H, and is operated by a crank, L, attached to one of its ends.

The bar F may be held out by a spring, M, interposed between the lower parts of the plates C H, but which is not considered essential.

The teeth are set by the punches N, which pass in through holes in the forward parts of the bars E F, and which are so arranged as to operate upon two consecutive teeth and set them at the same time. The punches N may be drawn back, after operating upon the teeth, by springs O attached to the bar F and plate B. The springs O are not essential, as the spring of the saw will throw the said punches back sufficiently. The punches N are forced in to set the teeth by the levers P, the forward ends of which rest against the outer ends of the said punches. The levers P work upon a bolt, Q, which passes through the plates B C, and to their rear ends are attached pins $p'$, which pass through the plates B C, and rest against the opposite sides of the cam-wheel J, so that the punches may be forced in to set the teeth by the revolution of the said wheel J. As the pins $p'$ are released from the wheel J the lower ends of the levers P are thrown outward to release the punches N by springs R, which press outward against their forward ends.

The springs R are not essential, as the spring of the saw is sufficient to throw back the said punches and levers.

S is a cam-wheel, placed upon the squared end of the crank-shaft K, and secured in place by a nut. The hole through the cam-wheel S is made in the form of a slot, so that the eccentricity of the cam, and, consequently, the length of the feed, may be adjusted according to the size of the teeth. T is a connecting-rod, one end of which is connected with the cam-wheel S; and its other end is pivoted to one arm of the elbow-lever U, which is pivoted at its angle to the forward bolt I. To the other arm of the elbow-lever U is pivoted a hook-rod, V, the hook of which drops over the points of the saw-teeth, so that, as each pair of teeth is set, the hook-rod V may be operated by the cam-wheel S to draw the machine forward into such a position as to operate upon the next pair of teeth.

If desired, a pin, W, may be attached to the bar E to support the free end of the hook-rod V, and prevent it from dropping down too far.

As shown and described, the machine is designed to move along a saw secured in a vise; but, if desired, the machine may be inverted and secured in a vise, the saw moving along the machine as the teeth are set. In the latter case the handle A need not be used, but may be replaced by a plate for the jaws of the vise to take hold of; or the plates B C may be extended for that purpose.

It should be observed that, in either case, the punches should be arranged near the upper edges of the bars E F, so as to operate upon the teeth near their points.

If desired, the punches N may be rigidly attached to the bars E F, and the machine used without the levers and feed.

Having thus described my invention, I claim as new and desire to secure by Letters Patent—

1. The combination of the plates B C, bar or flange D, adjustable bar E, movable bar F, plate H, pin $h'$, cam-wheel J, levers P, crank-shaft K, crank L, and punches N with each other, substantially as herein shown and described.

2. The combination of the levers P and pins $p'$ with the cam-wheel J, plates B C H, bars E F, and punches N, substantially as herein shown and described.

3. The combination of the cam-wheel S, connecting-bar T, elbow-lever U, and hook-rod V with the shaft K of the cam-wheel J, levers P, the plates B C H, bars E F, and punches N, substantially as herein shown and described.

GUSTAF SWENSON.

Witnesses:
   JAMES T. GRAHAM,
   T. B. MOSHER.